United States Patent [19]
Lindqvist

[11] Patent Number: 6,166,691
[45] Date of Patent: Dec. 26, 2000

[54] SELF-CALIBRATING REFERENCE TERMINAL

[75] Inventor: Dan Anders Lindqvist, Sollentuna, Sweden

[73] Assignee: Telefonaktiebolaget LM Ericsson (publ), Stockholm, Sweden

[21] Appl. No.: 09/216,480

[22] Filed: Dec. 21, 1998

[51] Int. Cl.[7] .................................................. G01S 3/02
[52] U.S. Cl. .................. 342/465; 342/450; 342/457; 342/463; 342/174; 455/456; 702/89
[58] Field of Search .................. 342/450, 457, 342/463, 465, 357.06, 165, 174; 455/456; 702/89

[56] References Cited

U.S. PATENT DOCUMENTS 5,327,144   7/1994   Stilp et al. ............................. 342/387
5,608,410   3/1997   Stilp et al. ............................. 342/387
5,717,406   2/1998   Sanderford et al. ................... 342/457

FOREIGN PATENT DOCUMENTS 2 243 055   10/1991   United Kingdom .
WO98/48578  10/1998   WIPO .

*Primary Examiner*—Thomas H. Tarcza
*Assistant Examiner*—Fred H Mull
*Attorney, Agent, or Firm*—Burns, Doane, Swecker & Mathis, L.L.P.

[57] ABSTRACT

A reference terminal used in positioning/locating of mobile terminals in a radiocommunication system is described. The reference terminal includes a time-of-arrival (TOA) receiver which is used to provide information associated with the location of mobile terminals. The TOA receiver also performs the function of calibrating the time delays within the reference terminal by measuring time delays associated with each time-sensitive component. For example, when the reference terminal transmits an uplink signal burst, e.g., reporting TOA information associated with a particular mobile terminal, a portion of this signal energy can be captured and propagated through antenna cables within the reference terminal. The TOA receiver can be used to determine time delays associated with the returned signal energy through various paths, which delays can be used to calibrate the positioning information generated by the reference terminal.

16 Claims, 7 Drawing Sheets

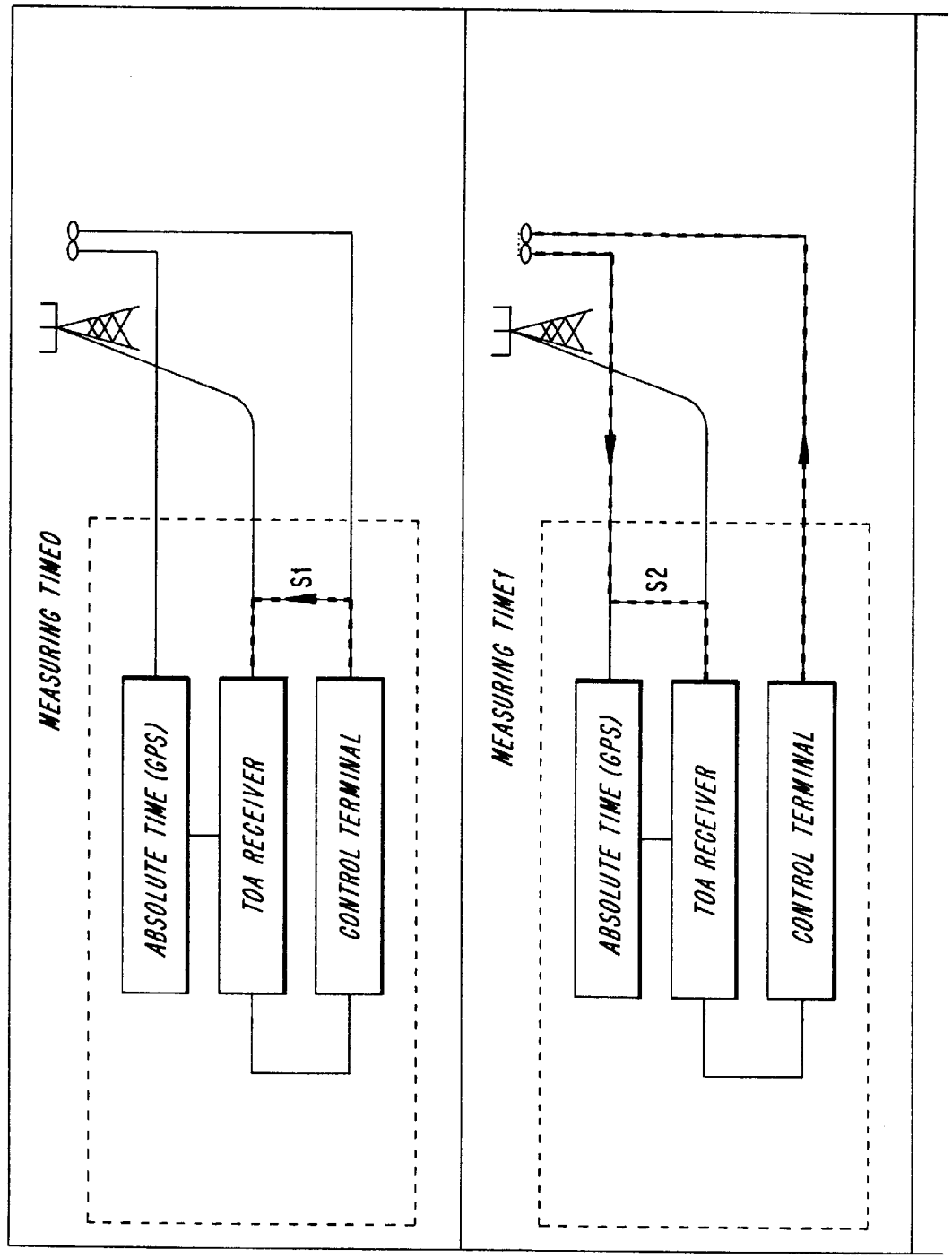

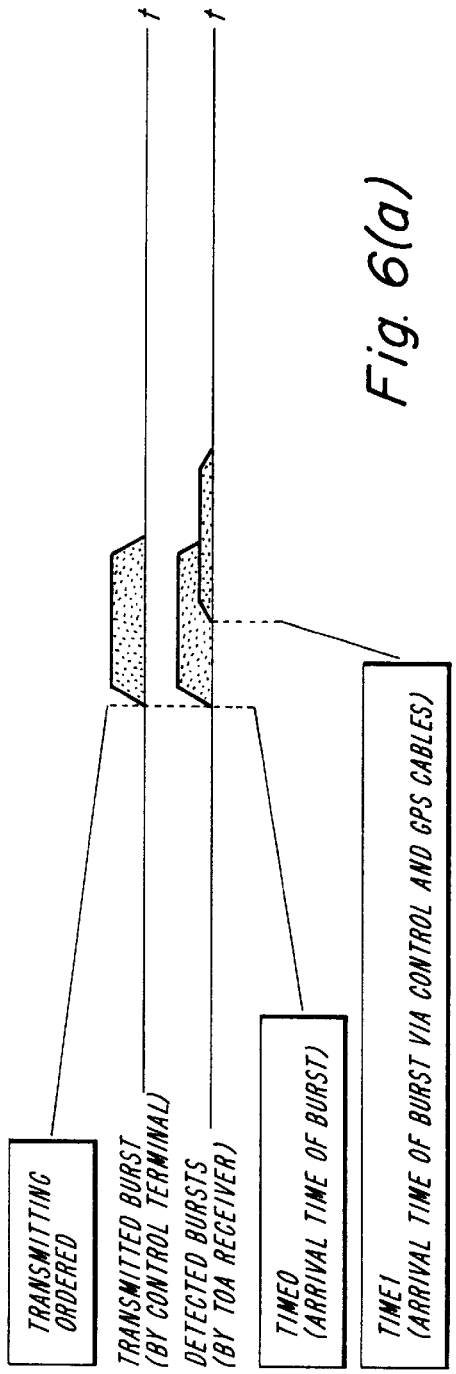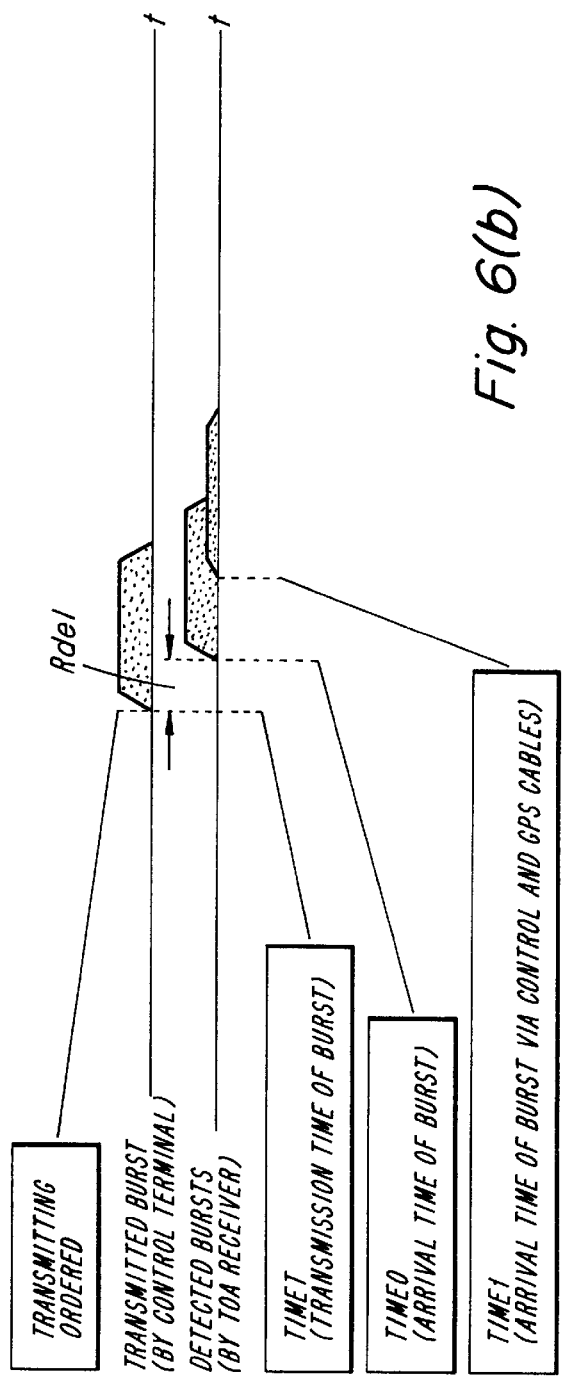

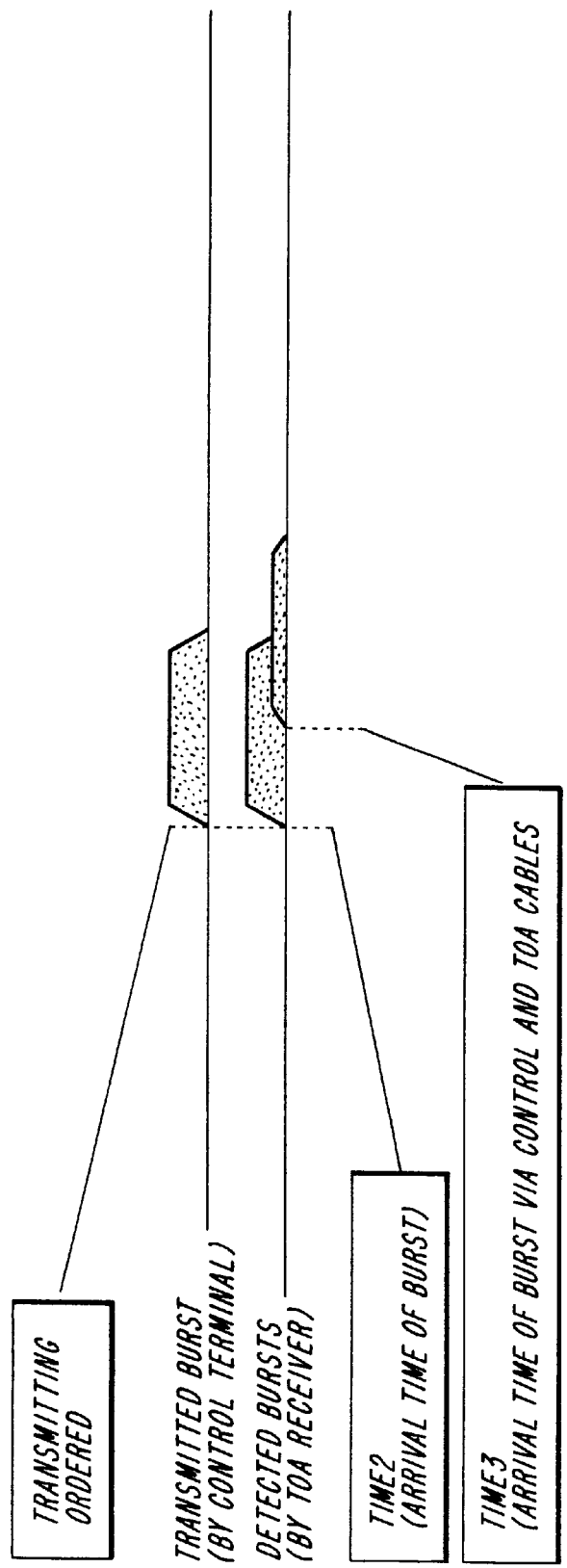

SELF-CALIBRATING REFERENCE TERMINAL

BACKGROUND

The present invention pertains to systems and methods involved in radiocommunication systems and, more particularly, to the calibration of reference terminals used in such systems.

The cellular telephone industry has made phenomenal strides in commercial operations in the United States as well as the rest of the world. Growth in major metropolitan areas has far exceeded expectations and is rapidly outstripping system capacity. One survey indicates that about 80% of the people who purchase mobile communication units and service subscriptions do so to enhance their personal security. Presumably, many of these subscribers would expect to use their mobile units to aid them in urgent situations, e.g., when their vehicle has become disabled or in an emergency situation requiring rapid medical and/or police response. In these circumstances it would be desirable that the radiocommunication system be able to independently determine a location of the mobile unit, particularly in the case where the subscriber does not know his or her precise location. Moreover, it is expected that the FCC will soon require that network operators forward the position of an emergency caller to the emergency service provider.

There are many techniques available to generate mobile unit location information. In a first category, the mobile unit could estimate its own position and send a message with its coordinates when placing an emergency call. This could be accomplished by, for example, providing the mobile unit with a Global Positioning System (GPS) receiver that receives location information from the GPS satellite network. The mobile unit can then transmit this information to the system, which would then forward it to the emergency service provider. This requires, however, significant modification of existing mobile units to include GPS receivers, as well as additional signaling between the mobile units and base stations.

Alternatively, the base stations which transmit signals to, and receive signals from, the mobile units could be used to determine the mobile unit's location. Various techniques, including attenuation of a mobile unit's signal, angle-of-arrival, and time-of-arrival (TOA) of a mobile unit's signal at different base stations, have been suggested for usage in providing mobile unit location information. For example, using the TOA technique, at a common measurement instant, several radio base stations (RBSs) measure the arrival time of a signal received from a mobile terminal (MT) whose position is to be determined. A central computing function converts the different arrival times of the MT's signal to distances, and calculates the results to determine the position of the MT. The precision in this TOA method is determined primarily by the exactness of the burst arrival time at each RBS, with respect to a common timing reference.

A third category of strategies for locating mobile units in radiocommunication systems involves the provision of an adjunct system, i.e., a system which may be completely independent of the radiocommunication system or which may share various components (e.g., an antenna) with the radiocommunication system but which processes signals separately therefrom. This may be advantageous, for example, as an expedient solution to providing mobile unit location without modifying the large number of existing base stations in a system. For example, consider the equipment illustrated in FIG. 1 wherein the adjunct scanning units are not co-located with the base stations of radiocommunication system. Therein, a base station 1 supports radiocommunication within cell 2 and, in particular with mobile unit 3. An adjunct system, partially shown by way of adjunct scanning units 4, 5 and 6, monitors accesses to the system by mobile unit 3. When mobile unit 3 makes an emergency access, adjunct units 4, 5 and 6 can detect this emergency access by, for example, the presence of a set emergency flag in an origination message or based upon the dialed number. The adjunct units can then use the mobile unit's transmissions on either a control channel or a traffic channel to provide information to a location processing center 7. The location processing center then uses the information provided by the various adjunct units to, for example, triangulate the position of mobile unit 3 and report this position to an emergency service center 8. More details regarding exemplary usages of adjunct systems can be found in U.S. Pat. No. 5,327,144 to Stilp et al., entitled "Cellular Telephone Location System", the disclosure of which is incorporated here by reference.

Alternatively, as suggested above, it may be desirable to co-locate portions of the adjunct system with the cellular system to share components. Accordingly, it would be desirable to design such adjunct systems, and devices employed therewith, which are efficient, easy to install and which require little maintenance, e.g., are self-calibrating.

SUMMARY

These, and other, drawbacks, limitations and problems associated with conventional positioning systems are overcome according to exemplary embodiments of the present invention wherein a self-calibrating reference terminal (RT) is described. The RT includes a TOA receiver which performs the dual functions of acquiring information associated with MT location and calibrating the internal time delays associated, for example, with the various antenna cables used to connect the RT with several antennas. In this way, the RT can accommodate changes in these internal time delays associated with, for example, temperature fluctuations, without requiring manual calibration.

In addition to a TOA receiver, RTs according to exemplary embodiments of the present invention include a control transceiver and an absolute time unit (e.g., a GPS receiver). When a control transceiver associated with the RT sends an uplink signal burst to the radiocommunication system, e.g., informing the system of the time-of-arrival of a burst from a particular mobile station at that RT, the uplink signal burst can also be used to make time measurements for internal calibration of the RT. For example, a portion of the uplink signal burst's energy may be captured by (1) a GPS antenna associated with the RT and (2) the RBS antenna system associated with the RT. Then, the resultant signals that propagate back through the respective antenna cables can be detected by the TOA receiver within the RT. The detection of these signals can be used to make time measurements indicative of the delays of each of the antenna cables within the RT, which delays can be used to calibrate the TOA measurements generated by the RT.

BRIEF DESCRIPTION OF THE DRAWINGS

The foregoing objects, features and advantages of the present invention, as well as other features, will be more readily understood upon reading the following detailed description in conjunction with the drawings in which:

FIG. 5 shows a first set of time measurements associated with an exemplary calibration technique according to the present invention;

FIGS. 6(a) and 6(b) are timing diagrams used to further describe the measurements illustrated in FIG. 5;

FIG. 8 is a timing diagram used to further describe the measurements illustrated in FIG. 7.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using the time division multiple access (TDMA) protocol, in which communication between the base station and the mobile terminals is performed in bursts over a number of time slots. However, those skilled in the art will appreciate that the concepts disclosed herein find use in other protocols, including, but not limited to, frequency division multiple access (FDMA), code division multiple access (CDMA), or some hybrid of any of the above protocols. Likewise, some of the exemplary embodiments provide illustrative examples relating to the Global System for Mobile communication (GSM) system, however, the techniques described herein are equally applicable to any radiocommunication system.

Figure 1:
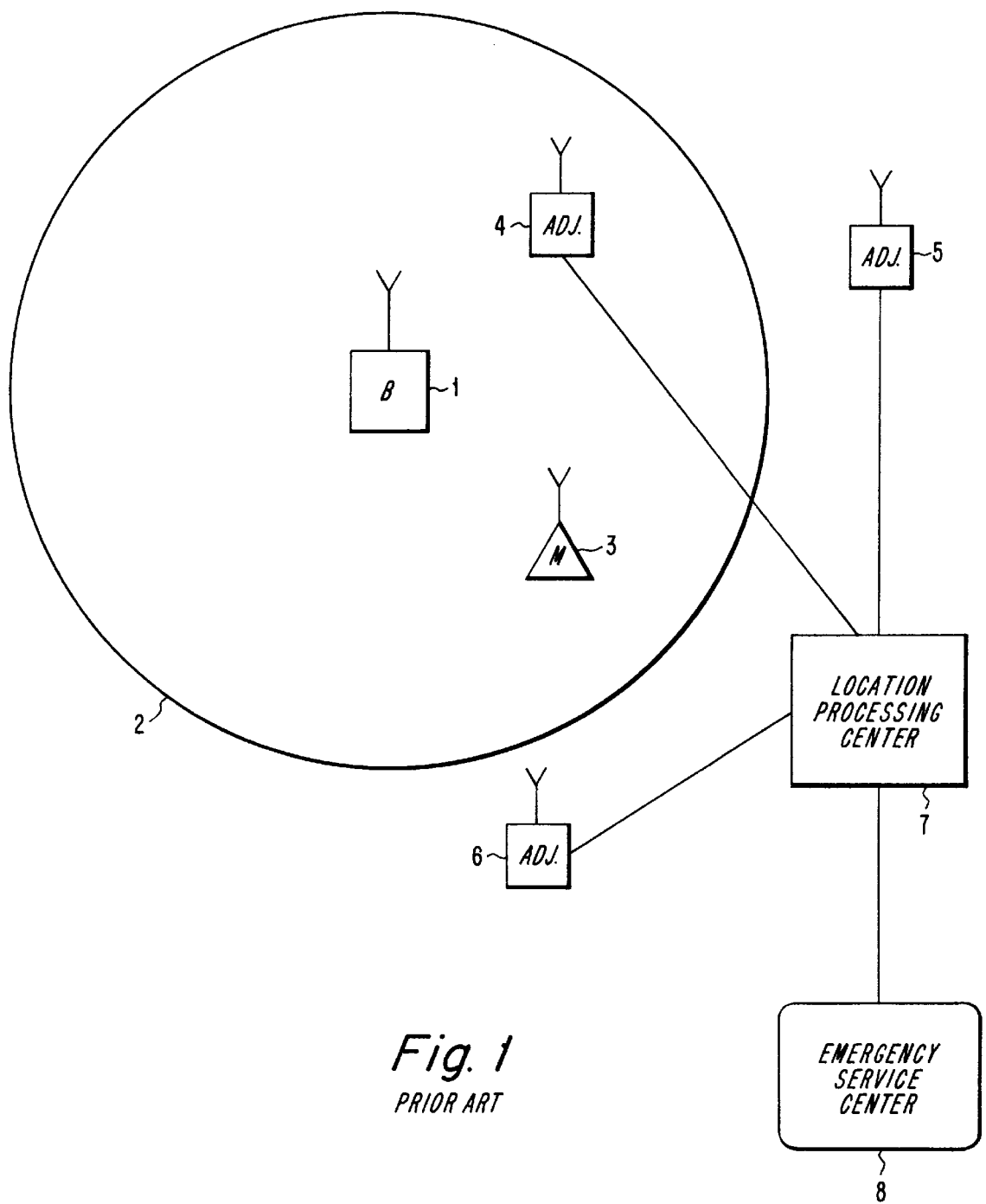
FIG. 1 shows a conventional adjunct positioning system and a cellular radiocommunication system wherein the adjunct scanning units are not co-located with the radio base stations of the cellular system.
Figure 2:
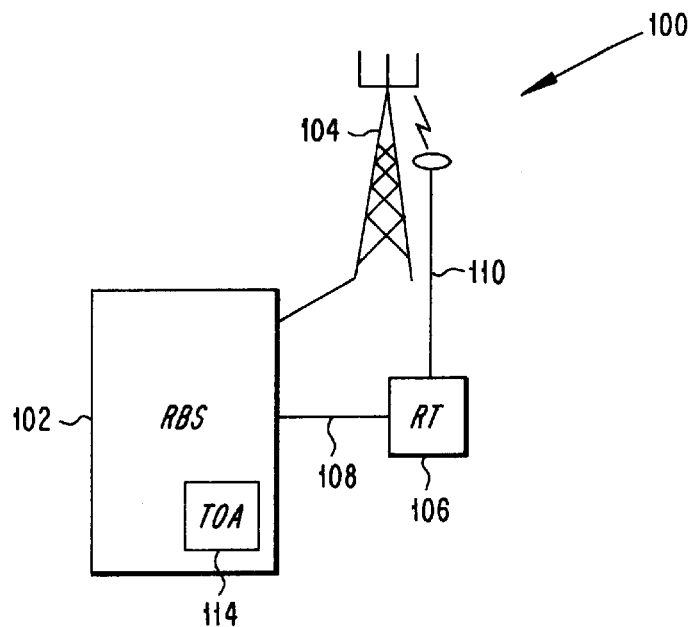
FIG. 2 depicts a radiocommunication system including an RT associated with an RBS wherein the TOA receiver is disposed in the RBS.

One way in which an adjunct positioning system can share components with a cellular radiocommunication system is illustrated in FIG. 2, wherein an absolute time unit (ATu) is connected to each RBS. For example, an ATu connected to an RBS can be implemented as a modified MT that includes a Global Positioning System (GPS) receiver. In FIG. 2, system 100 includes an RBS 102 coupled to an antenna subsystem 104. Although only one exemplary RBS 102 is shown, system 100 will, of course, include a number of additional RBSs as part of the cellular communications network.

System 100 also includes a reference terminal (RT) 106 coupled by, for example, a wireline connection 108 to the RBS 102. Connection 108 can provide power for RT 106 from RBS 102 and, optionally, connection 108 can provide data communications therebetween.

RT 106 can be a modified, but otherwise, standard version MT having a calibrated transmission delay. For example, the internal delays inherent in RT 106 are predetermined and stored locally for calibration purposes, along with the delay characteristics of the antenna cable 110. Cable 110 (with the known delay) couples RT 106 to a transmit/receive antenna which can be implemented as a combined GSM transmit/receive antenna section and GPS receive antenna section.

In addition to standard MT components, RT 106 also includes an absolute time reference unit (not shown), e.g., a GPS receiver. Consequently, the RT 106 receives highly accurate timing signals and/or absolute position information. The GPS receiver in the RT 106 can be synchronized with a phase-locked loop (PLL) in the RT. The absolute time information thus derived is used by a processor (not shown) in the RT 106 to mark precisely the instant in time when the RT transmits each burst over the air interface. The RT stores this burst timing information in local memory, and also forwards this absolute time information (e.g., burst X transmitted at time T) to the RBS 102 via connection 108 or over the air interface of the radiocommunication network. The burst timing information can also be forwarded to other network components by the RBS 102 using a standard message transfer protocol. The respective absolute burst timing information can be used to calibrate a TOA receiver 114 in the RBS 102.

One potential difficulty associated with the configuration illustrated in FIG. 2 is the need for repeated calibration of RT 106 to ensure knowledge of the time delays associated with the transmit and receive paths. For example, since RT 106 is preferably implemented using a modified version of a commercial MT and because commercial MTs are not necessarily optimized for constant time delays in their receive and transmit paths, RT 106 may require calibration during three phases—during production, during installation and during operation—in order to ensure the accuracy of the timing information supplied by RT 106 to RBS 102. Such an involved set of calibration procedures could be time consuming and expensive.

One possible solution to this problem is to build RTs using non-standard (relative to MTs) electrical components that provide for more constant time delays and, therefore, require less calibration. This solution, however, will also increase the expense of the RTs used in the adjunct positioning system.

Figure 3:
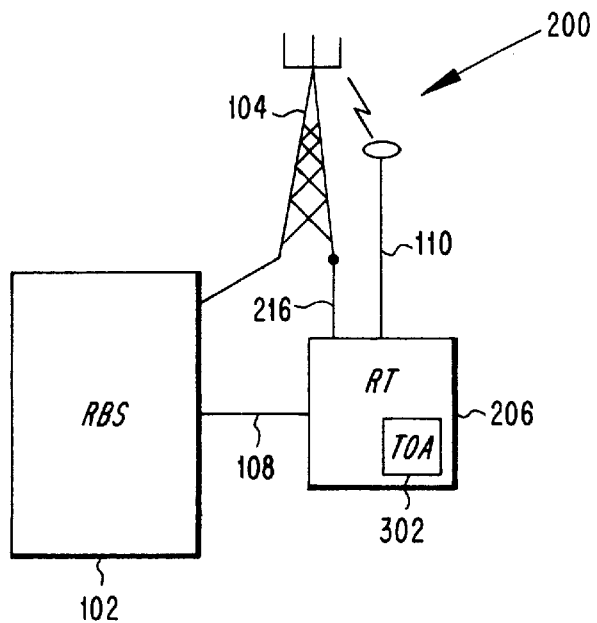
FIG. 3 shows a system according to an exemplary embodiment of the present invention wherein the TOA receiver is part of the RT and the RT is connected to the antenna system of the RBS.

Accordingly, FIG. 3 illustrates a portion of a combined radiocommunication/positioning system according to an exemplary embodiment of the present invention. Therein, like reference numerals have been used to refer to like elements illustrated in FIG. 2. Moreover, relevant portions of the foregoing description associated with the common elements between FIG. 2 and FIG. 3 are incorporated here by reference to avoid repetition thereof. However, system 200 of FIG. 3 differs from that of FIG. 2 in several significant respects. Initially, it will be seen that the TOA receiver 214 is disposed within RT 206 as opposed to residing within the RBS 102. According to the present invention, locating the TOA receiver in the RT permits, among other things, the TOA receiver 214 to perform the dual functions of obtaining position information related to MTs and calibrating the various cable-related time delays present within the RT as will be described below. Since the TOA receiver 214 is disposed in RT 206 instead of RBS 102, RT 206 is also provided with a connection 216, e.g., a cable, to the antenna structure 104 of the RBS so that the TOA receiver 214 is connected thereto.

Figure 4:
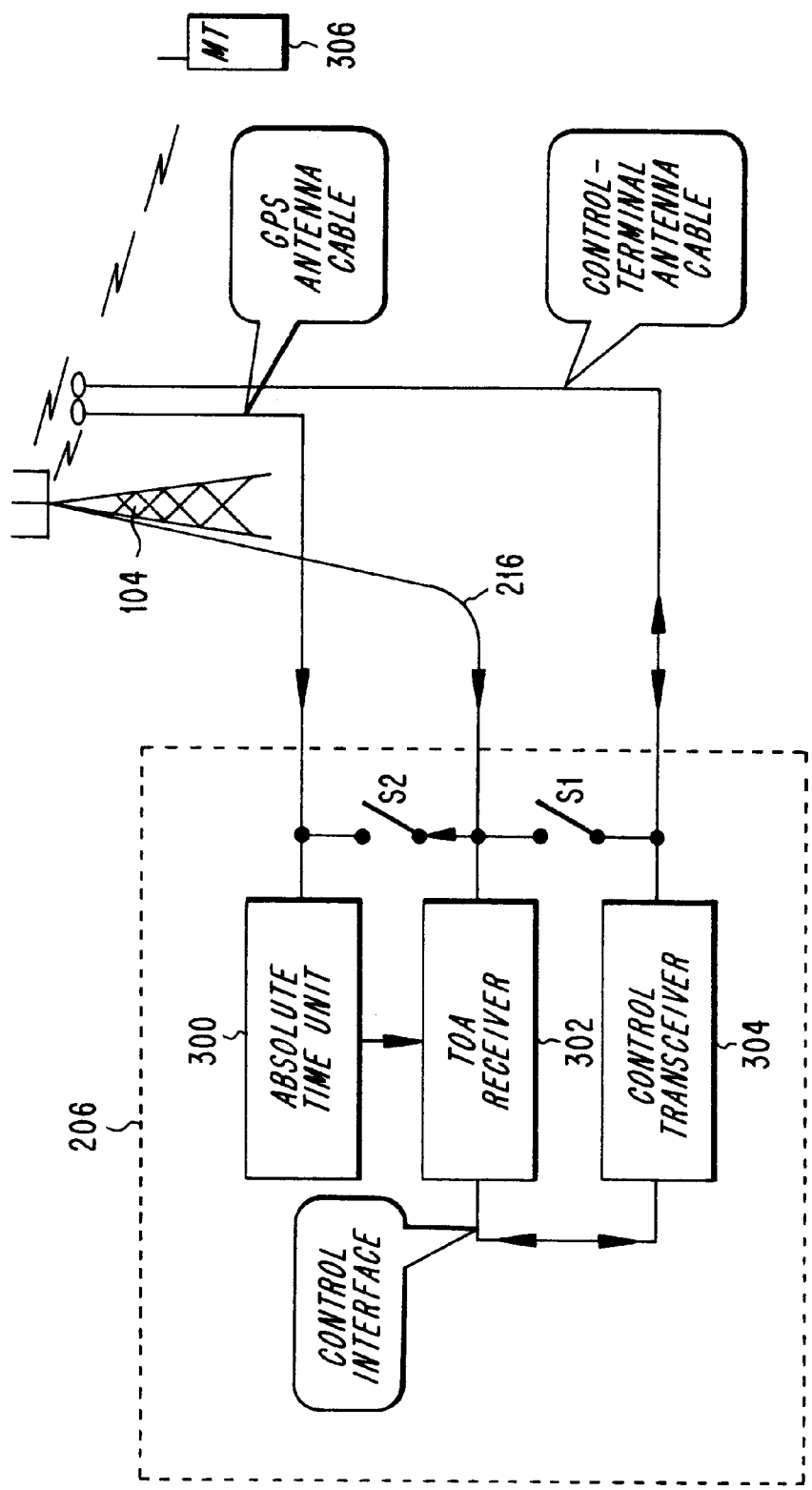
FIG. 4 shows a block diagram of the RT of FIG. 3 in more detail.

FIG. 4 is a block diagram illustrating RT 206 in more detail. Therein, the RT 206 can be seen to include an absolute time unit 300 (e.g., a GPS receiver), a TOA receiver 302 and a control transceiver 304. The absolute time unit 300 is connected, via a GPS antenna cable, to a GPS antenna so that it can receive timing/position related signals from the GPS system in a manner which will be well known by those skilled in the art. The TOA receiver 302 is connected, via TOA cable 216, to the RBS's antenna system 104, e.g., an array antenna. Like GPS receiver 300, the TOA receiver 302 can be implemented using any of a plurality of known receiver units and TOA algorithms. Readers interested in more detail regarding TOA units and algorithms are referred to U.S. patent application Ser. No. 08/839,864, entitled "Systems and Methods for Locating Remote Terminals in Radiocommunication Systems", to Raith et al., filed on Apr. 22, 1997, the disclosure of which is incorporated here by reference.

Figure 7:
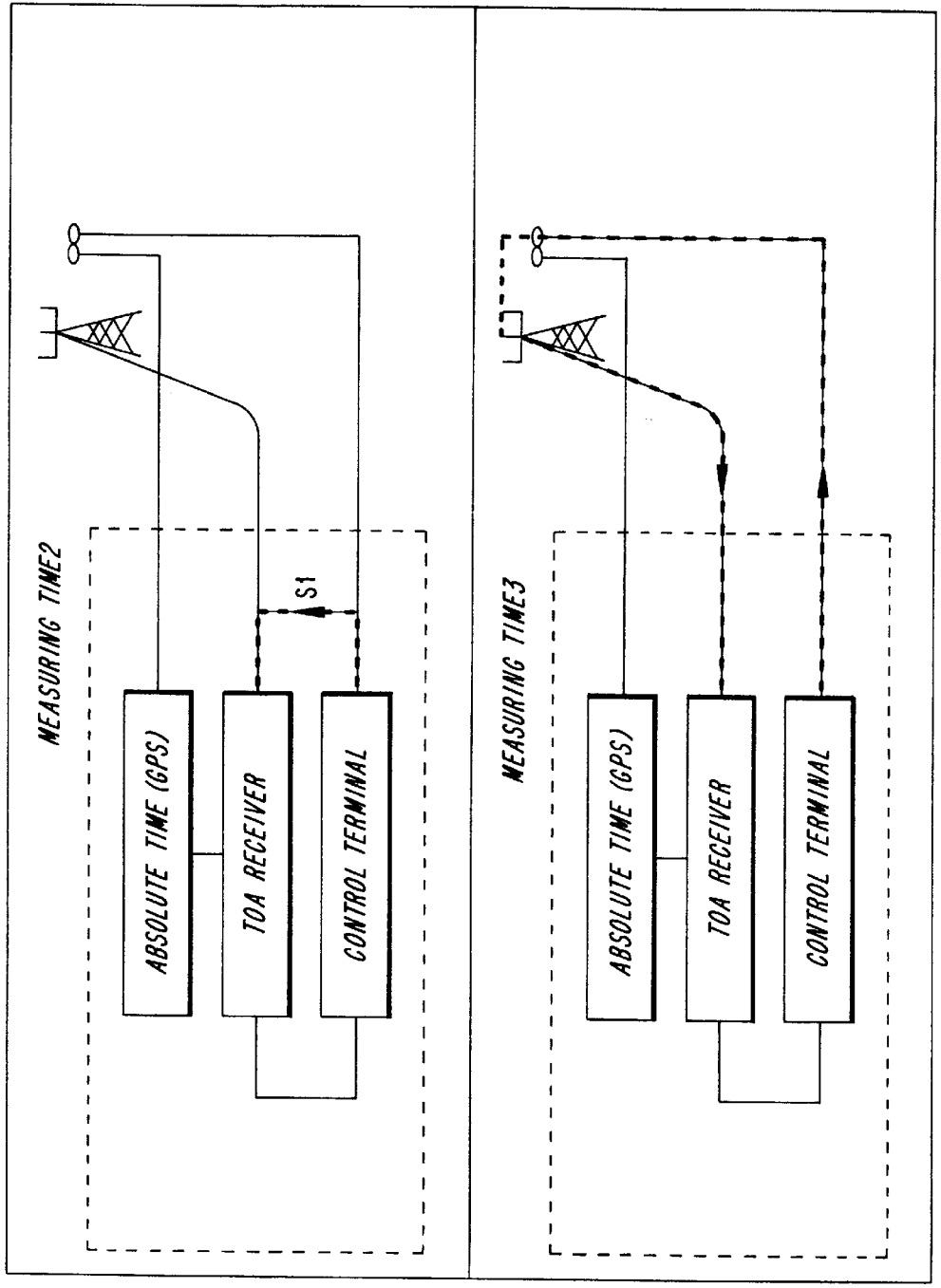
FIG. 7 shows a second set of time measurements associated with an exemplary calibration technique according to the present invention.

Control transceiver 304 operates to interface RT 206 with the radiocommunication system. For example, control transceiver 304 communicates with the radiocommunication system information regarding the TOA of various received signals for locating MTs, e.g., MT 306. Control transceiver 304 can be implemented using a standard transceiver as provided in MT 306. TOA receiver 302 identifies the time-of-arrival of one or more bursts from MT 306 using the absolute time reference provided by unit 300. Then, when so instructed by the radiocommunication system, control transceiver 304 receives this TOA information from the TOA receiver 302 (via a control interface between units 302 and 304) and forwards same to the radiocommunication system by transmitting a burst over the control terminal antenna cable and GSM antenna. According to exemplary embodiments of the present invention, the bursts transmitted by the control transceiver 304 for positioning/location of MTs can also be used to calibrate time delays within RT 206. Switches S1 and S2 are illustrated in FIGS. 4, 5 and 7 to conceptually depict the different signals being measured, however those skilled in the art will appreciate that these signals can be isolated and identified by virtue of their distinguishing time and/or frequency characteristics and that physical switches need not be used to perform the measurements described below.

When the control transceiver 304 transmits an uplink signal burst, this burst can be used to perform measurements, which measurements can be used to calibrate the time delays of, for example, all three antenna cables shown in FIG. 4. Consider, for example, the measurements illustrated in FIG. 5. Therein, two time measurements are illustrated which can be used to calibrate the delays associated with the GPS antenna cable and the control transceiver's antenna cable. Initially, when the uplink signal burst is transmitted by control transceiver 304, switch Si is closed whereby the burst is substantially immediately detected by the TOA receiver 302 and recorded as Time0, as conceptually shown in the upper portion of FIG. 5.

When the burst propagates through the control transceiver's antenna cable and is radiated outwardly into the air interface by the antenna, a portion of the radiated signal energy will be picked up by the GPS antenna. Then, this portion of the radiated signal energy will propagate back through the GPS antenna cable to reach the TOA receiver 302 when switch S2 is closed. Thus, TOA receiver 302 will record a second time, Time1, when a portion of the uplink signal burst transmitted by control transceiver 304 is subsequently received. This permits the control transceiver 304, or some other processor within RT 206, to calculate the time delay associated with the GPS and control transceiver antenna cables as:

$T_{cable}$=(Time1−Time0)/2, assuming that the length of the GPS antenna cable equals the length of the control transceiver's antenna cable. This set of measurements can also be described in the context of an exemplary timing diagram as seen in FIG. 6(a). Therein, the upper time axis depicts the timing of the uplink signal burst as it is transmitted by the control transceiver 304. The lower time axis depicts, first, reception of the same burst by the TOA receiver 302 and, subsequently, reception of the burst after propagation through the control and GPS cables.

While the timing diagrams shown in FIG. 6(a) assume that there is no delay within the TOA receiver 302 (i.e., that the transmission of the uplink burst by the control transceiver 304 and reception of that burst by the TOA receiver 302 occur substantially simultaneously), it is possible that the time-sensitive components in the TOA receiver may also vary somewhat. If so, the TOA receiver may have its own delay as shown in the timing diagrams of FIG. 6(b). Therein, the time period Rdel represents the delay associated with the TOA receiver, i.e., the time between the transmission time T of the uplink burst and reception of that burst by the TOA receiver. As with all of the other delays which are measured according to exemplary embodiments of the present invention, this delay can also be used in calibrating the RT 206.

Similar time measurements can be made to determine the time delay associated with the antenna cable linking the TOA receiver 302 to the RBS antenna system 104 as illustrated in FIG. 7. Therein, as in the foregoing example, a burst transmitted by control transceiver 304 is detected by the TOA receiver 302 as it is propagated through the control transceiver's antenna cable at Time2. Then, after being transmitted over the air interface, the uplink signal burst is captured by the RBS's antenna system 104 and detected again by TOA receiver 302 at Time3 after traveling through its own antenna cable. The delay associated with the antenna cable used to connect the TOA receiver and the RBS antenna system 104 can then be calculated as:

Receiver cable delay=Time3−Time2−$T_{cable}$

FIG. 8 is a timing diagram illustrating how the TOA receiver cable delay can be measured. Like that of FIGS. 6(a) and 6(b), the upper portion of FIG. 8 illustrates the timing of the transmission of an uplink signal burst by the control transceiver 304. Then, the lower portion of FIG. 8 illustrates the receive timing by the TOA receiver 302 of, first, the initial transmission of the uplink signal burst and, subsequently, of the portion of the signal energy captured by the RBS antenna system 104 and returned to the TOA receiver.

Having measured these various delays based upon one or more uplink signal bursts, RT 206 can use this information to calibrate the detected TOA information associated with a particular MT to be located as:

Calibrated TOA=Detected_arrival_time+GPS_cable delay−Receiver_cable delay−TOA_receiver delay.

Those skilled in the art will now appreciate that by placing the TOA receiver 302 in the RT 206 and using it to perform calibration as well as positioning measurements, a number of advantages are realized. For example, RT 206 can now independently calibrate its internal delays whenever it transmits uplink bursts. Of course, calibration need not be performed on all transmitted bursts but may instead be performed on a subset thereof.

Moreover, exemplary embodiments of the present invention remove any need to calibrate RTs during installation since they will immediately self-calibrate upon operation. RTs according to the present invention can also be implemented using off-the-shelf control transceivers since the afore-described calibration techniques permit the introduction of time delay variances which may occur in such devices. Moreover, these calibration techniques provide for updated calibrations that enhance accuracy and enable compensation for rapidly varying parameters, e.g., temperature compensation, without additional signaling over the air interface.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for calibrating a reference terminal used in locating a mobile terminal in a radiocommunication system comprising the steps of:

transmitting, from said reference terminal, a signal burst associated with a location of said mobile terminal at a first time;

receiving, at said reference terminal, a portion of said signal burst associated with said location of said mobile terminal at a second time; and calibrating at least one time delay within said reference terminal based on said first and second times.

2. The method of claim 1, wherein said step of receiving further comprises the steps of:

receiving said portion of said signal burst using a time-of-arrival (TOA) receiver, which receiver is also used to receive a signal burst from said mobile station.

3. The method of claim 2, wherein said step of receiving further comprises the step of:

receiving said portion of said signal burst by said TOA receiver via a GPS antenna cable and said at least one delay is a delay associated with said GPS antenna cable.

4. The method of claim 2, wherein said step of receiving further comprises the step of:

receiving said portion of said signal burst by said TOA receiver via a TOA antenna cable and said at least one delay is a delay associated with said TOA antenna cable.

5. The method of claim 2, wherein said step of calibrating further comprises:

calibrating a delay associated with said TOA receiver as said at least one time delay.

6. A method for calibrating a reference terminal used in a radiocommunication system comprising the steps of:

measuring, in said reference terminal, a first delay associated with at least one first cable;

measuring, in said reference terminal, a second delay associated with at least one second cable; and calibrating said reference terminal using said first and second measured delays.

7. The method of claim 6, wherein said at least one first cable includes a global positioning system (GPS) antenna cable and a radiocommunication system antenna cable.

8. The method of claim 6, wherein said at least one second cable includes a time-of-arrival (TOA) antenna cable.

9. The method of claim 7, wherein said first step of measuring further comprises the step of:

transmitting, from said reference terminal, a signal using said radiocommunication system antenna cable;

detecting, within said reference terminal, a first time at which said signal is transmitted;

propagating, at said reference terminal, a portion of said signal through said GPS antenna cable;

detecting, within said reference terminal, a second time at which said portion of said signal is received; and determining said first delay based on a difference between said second time and said first time.

10. The method of claim 9, wherein said steps of detecting are performed by a TOA receiver.

11. The method of claim 8, wherein said second step of measuring further comprises the step of:

transmitting, from said reference terminal, a signal using said radiocommunication system antenna cable;

detecting, within said reference terminal, a third time at which said signal is transmitted;

receiving, at said reference terminal, a portion of said signal through said TOA antenna cable;

detecting, within said reference terminal, a fourth time at which said portion of said signal is received; and determining said second delay based on a difference between said fourth time and said third time.

12. The method of claim 11, wherein said steps of detecting are performed by a time-of-arrival (TOA) receiver.

13. A terminal device for use in a radiocommunication system comprising:

a time reference unit connected to a first antenna via a first cable;

a time-of-arrival (TOA) receiver connected to a second antenna via a second cable;

a transceiver connected to a third antenna via a third cable; and means for using said TOA receiver to calibrate a time delay associated with said second cable.

14. The terminal device of claim 13, wherein:

said transceiver transmits an uplink signal burst via said third cable at a first time; and said means for using said TOA receiver to calibrate time delays associated with said second cable operates to receive a portion of said uplink signal burst via said second cable at a second time.

15. The terminal device of claim 13, wherein said means for using said TOA receiver to calibrate time delays further calibrates for delays associated with the TOA receiver itself.

16. The terminal device of claim 13, wherein said means for using said TOA receiver further comprises:

means for calibrating a time delay associated with said first cable.

* * * * *